United States Patent [19]

Gubitosa et al.

[11] Patent Number: 5,571,769
[45] Date of Patent: Nov. 5, 1996

[54] PROCESS FOR PREPARING A METAL CATALYST WITH IN SITU GENERATED CARRIER FOR THE HYDROGENATION OF ORGANIC COMPOUNDS AND CATLAYST OBTAINED BY MEAN OF SUCH A PROCESS

[75] Inventors: Giuseppe Gubitosa, Novara; Maurizio Giampeitri, Trecate; Giuliano Vecchiato, Padova, all of Italy

[73] Assignee: Ministero Dell 'Universita' e Della Ricerca Scientifica e Technologica, Rome, Italy

[21] Appl. No.: 260,023

[22] Filed: Jun. 15, 1994

[30] Foreign Application Priority Data

Jun. 16, 1993 [IT] Italy .................................. MI93A1292

[51] Int. Cl.$^6$ .............................. B01J 21/08; B01J 21/12; B01J 21/14
[52] U.S. Cl. ......................... 502/244; 502/158; 502/256; 502/260; 502/259; 559/141; 559/146
[58] Field of Search ..................................... 502/158, 244, 502/258, 259, 260, 256

[56] References Cited

U.S. PATENT DOCUMENTS

| | | | |
|---|---|---|---|
| 3,975,497 | 8/1976 | Wiewiorowski et al. | 423/140 |
| 4,002,719 | 1/1977 | Tsao | 423/141 |
| 4,018,816 | 4/1977 | Onada et al. | 260/486 R |
| 4,064,070 | 12/1977 | Harrison | 252/435 |
| 4,176,089 | 11/1979 | Cull | 252/452 |
| 4,184,982 | 1/1980 | Schroeder et al. | 252/452 |
| 4,209,424 | 6/1980 | LeGoff et al. | 502/259 |
| 4,218,571 | 8/1980 | Mitchell et al. | 585/277 |
| 4,273,680 | 6/1981 | Halluin et al. | 502/259 |
| 4,307,248 | 12/1981 | Barnett et al. | 585/270 |
| 4,532,351 | 7/1985 | Barnett et al. | 585/270 |
| 4,597,908 | 7/1986 | Lok et al. | 502/259 |
| 4,843,183 | 6/1989 | Inui | 502/158 |
| 5,087,599 | 2/1992 | Botman et al. | 502/259 |
| 5,112,792 | 5/1992 | Lok | 502/259 |
| 5,155,084 | 10/1992 | Horn et al. | 502/259 |

FOREIGN PATENT DOCUMENTS 397816 8/1933 Belgium.
2295010 7/1976 France.

*Primary Examiner*—Glenn A. Caldarola
*Assistant Examiner*—J. Pasterrczyk
*Attorney, Agent, or Firm*—George P. Hoare, Jr.

[57] ABSTRACT

A process for preparing a metal catalyst for the hydrogenation of oils and fats comprises causing a soluble Ni salt to react with an alkylsilane and an organic orthosilicate, so as to generate the catalyst support in Situ.

15 Claims, No Drawings

PROCESS FOR PREPARING A METAL CATALYST WITH IN SITU GENERATED CARRIER FOR THE HYDROGENATION OF ORGANIC COMPOUNDS AND CATLAYST OBTAINED BY MEAN OF SUCH A PROCESS

The present invention relates to a new process for preparing a supported metal catalyst suitable for hydrogenating organic substances, in particular, food oils and fats.

It is well known that the most required qualities from a catalyst are high activity and selectivity. In the case of chemical processes in the liquid phase, in which the supported metal catalyst is suspended, in powder form, in the reaction media, the causes of low catalyst selectivity and activity can be many, ranging from phenomena of diffusion of reactants, to an unevenness of dispersion of the active phase on the carrier. In particular, in the case of the hydrogenation of high molecular weight organic compounds, such as oils and fats, the diffusion phenomena inside the interior of the catalyst pores have a high influence on the selectivity and activity of the same catalyst.

In order to improve such properties, catalyst should be used which display a suitable morphology and porous structure and a high dispersion of the active element, so as to secure high performance behaviour in the hydrogenation reaction. For that purpose, nickel-based supported catalyst were proposed in which the carrier is generated by co-precipitation together with the nickel salt.

EP-A-259 119 discloses a process for preparing a hydrogenation catalyst in which to an amminocomplex of Ni, a solution of sodium aluminate is added. The subsequent heating up to 100° C. causes both Ni and the support to precipitate, with an Ni- and Al-based compound being obtained, which is subsequently filtered off, dried and activated. In such a process, water soluble alkaline aluminates are used which lead to the presence of ions in the catalyst which are only difficultly removed, and can reduce the performance of the same catalyst.

In U.S. Pat. No. 5,112,792, a process is disclosed for preparing a silica supported, Ni-based catalyst, in which a solution of sodium silicates is added to the suspension of nickel salts. Also in this case, therefore, difficultly removed elements (e.g., Na) are present in the catalyst, which can reduce the activity and selectivity performance of the same catalyst.

The purpose of the present invention therefore is a process for preparing a hydrogenation catalyst which, besides displaying the advantages deriving from an in situ generated carrier, does not suffer from the drawbacks found in the hydrogenation catalysts known from the prior art.

According to the present invention, such a purpose is achieved thanks to the fact that the process comprises an interaction between a soluble salt of active metal and an organic silicon compound having the general formula $$SiC_{n1}H_{n2}O_{n3}$$

wherein:

n1 is comprised within the range of from 2 to 21, n2 is comprised within the range of from 8 to 46, and n3 is comprised within the range of from 0 and 4.

The use of an organic silicon compound having the above general formula does not introduce elements which are difficult to be removed from the catalyst (for example, $Na^+$), making it possible for the catalyst performance, in terms of activity and selectivity rate, to be optimized.

The organic silicon compounds used in the process according to the present invention preferably are silanes, siloxanes and/or silcarbanes which are added, mostly in solution form, to an aqueous solution containing a compound of the active metal. Organic silicon compounds which are preferably used in the present invention are the following: dimethyloctadecyl silane, (methoxymethyl) trimethylsilane, methoxy trimethyl silane, tetraethylsilane, tetramethylsilane, triethoxysilane, triethylsilanol, triethylsilane, triisobutyl silane, triisopropyl silane, trimethoxy silane, tetraethoxysilane, tetramethoxysilane.

Particularly preferred are alkylsilanes and organic orthosilicates (alkoxysilanes).

Preferably the process comprises preparing an ammoniacal solution of a compound of the active metal, adding, to the resulting solution, kept at room temperature, or preliminarily heated up to a temperature comprised within the range of from room temperature up to 100° C., an organic silicate in such an amount as to obtain an end value of molar $SiO_2$/metal ratio comprised within the range of from 0.15 to 1.2, and heating the resulting solution for a proper time interval, so as to obtain the precipitation of a solid material deriving from the interaction between the active metal salt and the organic silicate. Under "active metal", one or more metal(s), as normally used as active component(s) of hydrogenation catalysts, e.g., nickel, cobalt, copper and chromium, is(are) meant herein.

During the course of the preparation process, owing to the hydrolysis and/or heat treatments the alkoxysilanes are submitted to, from said alkoxysilanes $SiO_2$ and/or products of metasilicate type are formed, onto which the active catalyst component gets deposited. We furthermore think that the interaction between the incipient phase of hydrous silica, resulting from the hydrolysis of alkoxy silanes, with a solution of the active element(s) may lead to the formation of stable Si-Me-Si (silicon-metal-silicon) compounds on which the catalyst precursor gets deposited in a highly dispersed form.

Upon precipitation, the organic component of silicon compound remains at least partly embedded inside the precipitation mass. During the subsequent drying, firing and reduction steps to obtain the end catalyst, the organic component is removed, inducing morphological changes which are such as to lead to a catalyst which is particularly suitable for the hydrogenation of large-size molecules, in particular of triglycerides.

The process according to the present invention preferably comprises the following steps: preparing ammoniacal solutions of the active metal(s), slowly adding, with strong stirring, at room temperature, an alkoxysilane (silicon alkoxide) $Si(OR)_4$, either neat or in solution in the corresponding alcohol HOR, to the ammoniacal solution of the active metal(s), keeping the resulting suspension with stirring during a longer time than 30 minutes, heating the suspension up to a temperature close to 100° C., until the active metal and silicon compound have been completely precipitated from the solution, isolating the solid from the mother liquors, drying and firing the resulting solid material, reducing said solid material with $H_2$, and sheltering the so obtained pyrophoric catalyst with a low melting fat.

The steps during which the suspension is kept with stirring is preferably 30–60 minutes long, and is preferably carried out at room temperature.

Good results were obtained, using, as active metals, nickel, cobalt, copper and chromium, in such amount as to have, in the end catalyst, from 10% to 70% by weight of supported metal.

The catalyst obtained by means of the process according to the present invention is particularly useful for the hydrogenation of food and/or industrial oils. In this case, the precursor of the active components of the catalyst is preferably an ammino/complex of nickel, such as $Ni(NH_3)_xCl_2$, $Ni(NH_3)_x(OH)_2$, $Ni(NH_3)_x(NO_3)_2$, in particular, $Ni(NH_3)_6CO_3$ obtained from nickel metal, ammonia, ammonium carbonate and a stoichiometric amount of hydrogen peroxide.

Preferably, the initial metal solution has a concentration comprised within the range of from 5 g/l to 45 g/l, more preferably of from 10 g/l to 30 g/l, and the molar $NH_3$/metal ratio is preferably comprised within the range of from 6 to 9. The molar metal/$CO^{2-}_3$ ratio is preferably comprised within the range of from 1 to 2. Preferred organic silicon salt is $Si(OC_2H_5)_4$ (tetraethoxysilane).

The drying process is preferably carried out at 120° C., and the subsequent firing is performed at temperatures comprised within the range of from 300° C. to 600° C. The catalyst can be used after being reduced with hydrogen, as such, in the absence of air, or passivated, or, preferably, protected with a low-melting fat.

The low-melting (m.t. about 60° C.) protecting hydrogenated fat is used in amounts comprised within the range of from 50% to 80%.

Particularly good results from triglyceride hydrogenations have been obtained when a portion of nickel was replaced by a same molar amount of copper, so that the molar ratio of Ni/Cu was comprised within the range of from 1.5 to 8, and preferably was of about 2, with such a value of said ratio being obtained with a copper concentration in the starting solution comprised within the range of from 2 to 30 g/l.

The calcination temperatures of Ni/Cu-based catalysts are comprised within the range of from 300° to 600° C., preferably of 400° C., and the reduction under a flowing hydrogen stream is carried out at temperatures comprised within the range of from 200° C. to 600° C., preferably of from 300° C. to 400° C.

The catalyst is used in concentrations which are preferably comprised within the range of from 0.05 to 0.40% by weight in the hydrogenation down to an iodine value of 80, and of from 0.20% to 0.60% in the hydrogenation down to an iodine value close to 0.

A particular, advantageous application of the catalyst according to the present invention is its use for the hydrogenation of food oils and fats. The hydrogenation process is carried out in stirred reactors of tank type, generally batchwise, and in some cases with a cascade of a plurality of reactors in order to allow continuous processes to be carried out. The catalyst in the solid state is dispersed throughout the liquid material to be hydrogenated, and through the suspension hydrogen is bubbled under the desired pressure value.

The hydrogenation of fats, according to said three-phase process (solid phase, liquid phase, gas phase) primarily aims at increasing the melting point, improving the stability of the oil, and obtaining products displaying constant characteristics even when several different types of feedstock are used. The activity, and, in particular, the selectivity of the catalyst used in this type of process are of basic importance, because the quality of the hydrogenated product depends on them.

In general, during the course of hydrogenation, the operators aim at keeping the component deriving from complete hydrogenation (esters of stearic acid) always at very low levels in the triglyceride, in favour of products with high contents of monounsaturated acids (oleic acid) and, to a minor extent, of dienic acids (linoleic acid).

Furthermore, in order to retain the high nutritional value of the fat and obtain products displaying desired rheological properties, the contents of trans- isomers should be kept at very low levels. These targets can be achieved, with the other operating process conditions being the same, with such catalysts displaying particular morphology and composition characteristics, as those obtained by means of the process according to the present invention.

The following examples show in detail the processes for obtaining the catalysts according to the present invention, however without being unduly limitative of the purview of protection of the same invention.

The more important data relevant to the preparations disclosed in the examples and the physical-chemical characterizations of the catalysts carried out on the products obtained from 400° C. calcination are reported in following Table 1 and 2 (in which the surface area, the pore volume and the pore radius distribution have been determined by nitrogen absorption according to the B.E.T. method, and the maximal value of reduction peaks and metal reducing ability were determined by programmed temperature reduction (P.T.R.) analysis.

EXAMPLE 1

An amount of 42.8 g of nickel metal in powder form was added with mechanical stirring to 1.2 litres of an aqueous solution containing 4.72 mol of $NH_3$ and 0.825 mol of $(NH_4)_2CO_3$; the suspension was then heated up to a temperature of about 75° C. After reaching such a temperature value, to the heated suspension a volume of 100 cm³ was added of a solution of hydrogen peroxide at 33% by volume, with a constant flow rate, and with the temperature of the solution being kept under 80° C. During the course of hydrogen peroxide addition, nickel went into solution in an amminocomplex form. Four hours later, the addition of hydrogen peroxide came to an end, and the deep blue coloured solution was filtered in order to separate any unreacted metal powders.

The solution, the volume of which was of 1400 cm³, contained 42.6 g of Ni, which means that during the chemical attack 99.5% of Ni was dissolved as carbonate-amminocomplexes.

To the resulting solution, 120 cc of tetraethyl orthosilicate (31.7 g of $SiO_2$) was added with mechanical stirring, at room temperature and during about 30 minutes, so as to obtain a molar ratio of $SiO_2$/Ni of about 0.72. The suspension was kept with mechanical stirring at room temperature during about 30 minutes, and then was heated up to its boiling temperature, with the heating time being as short as possible; the suspension was kept at its boiling temperature for about 4 hours, caring—as the step was being carried out in an open tank—of keeping the liquid level constant by means of water additions.

At the end of the treatment, the solid green material contained in the suspension was filtered off from the mother liquors; the colourless filtrate contained about 0.01 p.p.m. (parts per million parts) of nickel; the pale green residue, containing about 50% of water, was dried at 120° C. during 16 hours in an air-circulation oven, with 107.8 g being obtained of a crumbly solid material easily crushed into a powder.

Ten grams of such a powder material was fired at 400° C. for 2 hours, with a weight loss of 18% being observed. The firing residue was charged to a tubular reactor and was exposed to a flowing hydrogen stream (10 l/h) at 400° C. for 4 hours; 7.2 g was obtained of a non-magnetic, pyrophoric black powder, which was subsequently protected with 16.8 g of fat melting at 60° C.

EXAMPLE 2

(Comparison Example)

A comparison catalyst was prepared, which was based on Ni supported on fossil meal. Example 1 was repeated, with silica generated in Situ from the hydrolysis of tetraorthosilicate being replaced with an equimolar amount of silica from fossil meal (based on $SiO_2$ content), with 104.2 g of a crumbly solid product being obtained at drying end.

Ten grams of such a solid product was fired at 400° C., with a weight loss of 17% being obtained; the residue was then reduced under a flowing nitrogen steam at a temperature of 400° C., with the weight loss at the end of the 4-hour reduction time being of 15.7%.

EXAMPLE 3

Example 1 was repeated, but a molar ratio of silica:metal of 0.25 was used.

EXAMPLE 4

To a volume of 1300 cm³ of an ammoniacal solution containing 26.95 g of nickel, obtained by means of the chemical attack of metal nickel according to the same procedure as of Example 1, 16.67 g of copper metal powder was added and dissolved with $H_2O_2$. To the filtered solution, which contained nickel and copper in an atomic ratio of 1.75, 120 cm³ of tetraethylorthosilicate (31.7 g of $SiO_2$) was added, as disclosed in Example 1.

The interaction methodology was the same as of Example 1, but for a lower reduction temperature value (350° C.).

CATALYTIC TESTS

The catalysts prepared in Examples 1–4 were submitted to catalytic tests for activity and selectivity rate in food oils hydrogenation, under different experimental conditions, according to the following general procedure.

The body of an autoclave of 1000 cm³ of volume is charged with 300 g of soy bean oil to be hydrogenated (starting iodine value 135) and such an amount of catalyst that its concentration in the reaction media is of about 0.2% by weight (400 ppm of total Ni). The autoclave is sealed and purge cycles by alternatively applying vacuum and inert gas are carried out in order to remove air from it. Heating is started and approximately 2 hours later, the reaction temperature (about 204° C.) is reached; the inert gas is now replaced by hydrogen, the pressure is adjusted at 2 bars and the autoclave is connected with a hydrogen tank having a known volume and a constant temperature. As soon as hydrogen is charged to the autoclave, the mechanical stirring is started (approximately 1180 revolution per minute) and the consumed hydrogen volume is measured by means of a precision pressure gauge installed on the tank.

In following Table 3, the activity and selectivity rate values are reported of the catalysts of Examples 1–4 used in the hydrogenations to iodine value 80.

In Table 4, the values of Solid Fat Content (SFC) are reported, as a function of temperature, of the product of soy bean oil hydrogenation to iodine value 80, as carried out with the catalysts of Example 1–4. The determination of SFC was carried out with a pulsed N.M.R. technique. A higher solid content is indicative of a lower catalyst selectivity. The activities are expressed as absorbed hydrogen mols per hour (Table 3), per each gram of nickel.

As regards the selectivity rate, when the iodine value of the hydrogenated product is close to 80, samples are collected for the determination of the content of saturated, unsaturated and cis-trans acid contents by gas chromatography, after preliminarily converting glycerol esters into methyl esters.

TABLE 1

| Example | $SiO_2$/metal ratio (by mol) | Ni/Cu ratio by mol | Firing temperature, °C. | Reduction temperature, °C. | % Ni content in the catalyst, by weight | % Cu content in the catalyst, by weight |
|---|---|---|---|---|---|---|
| 1 | 0.72 | ∞ | 400 | 400 | 15.5 | — |
| 2 | 0.72 | ∞ | 400 | 400 | 21.9 | — |
| 3 | 0.25 | ∞ | 400 | 400 | 31.3 | — |
| 4 | 0.72 | 1.75 | 400 | 350 | 11.5 | 7.1 |

TABLE 2

| Example | Specific surface area, m²/g | Pore volume, cm³/g | % of pores with longer radius than 25 | Temperature of max. of P.T.R. peaks, °C. | Ratio of 1st peak/2nd peak surface areas | Reduction degree, % |
|---|---|---|---|---|---|---|
| 1 | 298 | 0.25 | 45 | 315, 480 | 0.93 | 93 |
| 2 | 286 | 0.28 | 14 | 370 | ∞ | 95 |
| 3 | 133 | 0.22 | 65 | 296, 512 | 10.0 | 87 |
| 4 | 204 | 0.21 | 19 | 166 | ∞ | 67 |

TABLE 3

| Example | Activity, H2 mol/h per Ni g | Selectivity | | | | | | | |
|---|---|---|---|---|---|---|---|---|---|
| | | % C16:0 Palmitic acid | % C18:0 Stearic acid | % C18:1t | % C18:1c Oleic acid | % C18:2cc Linoleic acid | % C18:2tt | % C18:3ccc Linolenic acid | % Total trans acids |
| 1 | 6.6 | 11.72 | 8.03 | 37.41 | 34.60 | 3.08 | 4.45 | <0.10 | 41.86 |
| Comp. Ex. 2 | 5.9 | 12.20 | 6.73 | 40.71 | 33.25 | 3.51 | 2.64 | <0.10 | 43.35 |
| 3 | 3.3 | 12.00 | 8.82 | 35.23 | 37.20 | 3.82 | 1.89 | <0.10 | 39.05 |
| 4 | 10.6 | 12.10 | 7.36 | 37.47 | 36.20 | 2.97 | 3.71 | <0.10 | 41.18 |

Activity determined at 204° C., with stirring at 1,180 rpm, 0.6 g of catalyst in 300 g of soy bean oil (from I.V. 135 down to I.V. 80)

TABLE 4

| Example | SFC at 10° C. | SFC at 15° C. | SFC at 20° C. | SFC at 25° C. | SFC at 30° C. | SFC at 35° C. |
|---|---|---|---|---|---|---|
| 1 | 51.64 | 42.26 | 25.41 | 13.88 | 3.92 | 0.00 |
| 2 Comparison Example | 51.28 | 40.84 | 24.02 | 12.36 | 2.82 | 0.00 |
| 3 | 44.19 | 34.24 | 19.28 | 9.99 | 2.72 | 0.00 |
| 4 | 49.14 | 38.50 | 22.67 | 11.47 | 3.27 | 0.00 |

Activity determined at 204° C., with stirring at 1,180 rpm, 0.6 g of catalyst in 300 g of soy bean oil (from I.N. 135 down to I.N. 80); SFC = Solid Fat Content, % by weight

We claim:

1. Process for preparing a supported metal catalyst for hydrogenating organic compounds, comprising:

(a) preparing an ammoniacal solution of at least one active metal selected from the group consisting of nickel, cobalt, copper, and chromium;

(b) reacting the ammoniacal solution with an organic silicon compound having the general formula $$SiC_{n1}H_{n2}O_{n3}$$

wherein n is from 2 to 21, n2 is from 8 to 46, and n3 is from 0 to 4;

(c) isolating the solid reaction product;

(d) drying and firing the isolated reaction product; and (e) reducing the dried and fried reaction product.

2. Process according to claim 1, wherein the organic silicon compound is selected from at least one member of the group consisting of dimethyl octadecyl silane, (methoxymethyl) trimethyl silane, methoxy trimethyl silane, tetraethyl silane, tetramethyl silane, triethoxy silane, triethyl silanol, triethyl silane, triisobutyl silane, triisopropyl silane, trimethoxy silane, tetraethoxy silane, tetramethoxy silane, and mixtures thereof.

3. Process according to claim 1, wherein the organic silicon compound is an alkyl silane or an organic orthosilicate.

4. Process according to claim 1, wherein the organic silicon compound is tetraethoxy silane.

5. Process according to claims 1, 2, 3 or 4, wherein the ammoniacal solution of the active metal is prepared by mixing nickel, ammonia, ammonium carbonate, and hydrogen peroxide.

6. Process according to claim 1, wherein the ammoniacal solution contains nickel and copper in a Ni/Cu ratio of from 1.5 to 8.

7. Process according to claim 2 wherein the ammoniacal solution contains nickel and coper in a Ni/Cu ratio of from 1.5 to 8.

8. Process according to claim 3 wherein the ammoniacal solution contains nickel and copper in a Ni/Cu ratio of from 1.5 to 8.

9. Process according to claim 4 wherein the ammoniacal solution contains nickel and copper in a Ni/Cu ratio of from 1.5 to 8.

10. Catalyst prepared according to the process of claim 1, wherein the molar $SiO_2$ to active metal ratio is from 0.15 to 1.2.

11. Catalyst prepared according to the process of claim 2, wherein the molar $SiO_2$ to active metal ratio is from 0.15 to 1.2.

12. Catalyst prepared according to the process of claim 3, wherein the solar $SiO_2$ to active metal ratio is from 0.15 to 1.2.

13. Catalyst prepared according to the process of claim 4, wherein the solar $SiO_2$ to active metal ratio is from 0.15 to 1.2.

14. Catalyst prepared according to the process of claim 5, wherein the solar $SiO_2$ to active metal ratio is from 0.15 to 1.2.

15. Catalyst prepared according to the process of claim 6, wherein the solar $SiO_2$ to active metal ratio is from 0.15 to 1.2.

* * * * *